United States Patent
Finkenrath et al.

(10) Patent No.: US 8,347,629 B2
(45) Date of Patent: Jan. 8, 2013

(54) SYSTEM AND METHOD FOR REDUCING MOISTURE IN A COMPRESSED AIR ENERGY STORAGE SYSTEM

(75) Inventors: Matthias Finkenrath, Garching b. Muenchen (DE); Cristina Botero, Cambridge, MA (US); Sebastian Walter Freund, Unterfoehring (DE); Clarissa Sara Katharina Belloni, Munich (DE); Miguel Angel Gonzalez Salazar, Munich (DE); Stephanie Marie-Noelle Hoffmann, Munich (DE); Roland Marquardt, Gelsenkirchen (DE); Kurt Peter Moser, Köln (DE); Stefan Martin Zunft, Stuttgart (DE)

(73) Assignee: General Electric Company, Niskayuna, NY (US)

( * ) Notice: Subject to any disclaimer, the term of this patent is extended or adjusted under 35 U.S.C. 154(b) by 85 days.

(21) Appl. No.: 12/609,081

(22) Filed: Oct. 30, 2009

(65) Prior Publication Data
US 2011/0100213 A1 May 5, 2011

(51) Int. Cl.
*F01K 25/02* (2006.01)
*B01D 53/14* (2006.01)

(52) U.S. Cl. ........... 60/659; 60/650; 60/627; 96/243; 96/295; 95/227; 95/231

(58) Field of Classification Search ........... 60/659, 60/649, 727, 652, 682, 651, 650, 663, 716, 60/719, 773, 772, 805, 39.15, 415; 165/10
See application file for complete search history.

(56) References Cited

U.S. PATENT DOCUMENTS

| | | | |
|---|---|---|---|
| 3,287,883 A | 11/1966 | Mott | |
| 3,399,510 A | 9/1968 | Kauer, Jr. et al. | |
| 3,778,967 A | 12/1973 | Kauer, Jr. et al. | |
| 4,593,202 A | 6/1986 | Dickinson | |
| 5,317,904 A | 6/1994 | Bronicki | |
| 5,448,889 A * | 9/1995 | Bronicki | 60/641.14 |

(Continued)

FOREIGN PATENT DOCUMENTS
DE 2636417 A1 2/1978
(Continued)

OTHER PUBLICATIONS

Search Report and Written Opinion from corresponding PCT Application No. PCT/US2010/051298 dated Aug. 19, 2011.

*Primary Examiner* — Duane Smith
*Assistant Examiner* — Pankti Patel
(74) *Attorney, Agent, or Firm* — Andrew J. Caruso

(57) ABSTRACT

A method, system, and apparatus including a compressed air energy storage system that includes an ambient air intake configured to intake a quantity of ambient air for storage in a compressed air storage volume, a compression system having a compression path that is configured to convey air compressed by the compression system through the compression system, a first path configured to convey ambient air to the compression system, a second path proceeding from the compression system to the compressed air storage volume and configured to convey compressed air to the compressed air storage volume, and a dehumidifying system. The dehumidifying system is coupleable to at least one of the first path that proceeds from the ambient air intake to the compression system, the compression path, and the second path. The dehumidifying system includes a dehumidifying component configured to remove moisture from the ambient air and/or the compressed air.

5 Claims, 5 Drawing Sheets

U.S. PATENT DOCUMENTS

| | | | | |
|---|---|---|---|---|
| 5,537,813 A * | 7/1996 | Davis et al. | | 60/775 |
| 5,537,822 A * | 7/1996 | Shnaid et al. | | 60/659 |
| 5,697,763 A * | 12/1997 | Kitchener | | 417/28 |
| 6,616,735 B1 * | 9/2003 | Burban et al. | | 96/8 |
| 6,764,529 B2 | 7/2004 | Nichols et al. | | |
| 6,951,111 B2 * | 10/2005 | Chen | | 60/775 |
| 6,955,705 B1 * | 10/2005 | Cheney et al. | | 95/42 |
| 7,179,320 B2 | 2/2007 | Iies et al. | | |
| 7,326,277 B1 * | 2/2008 | Cohen et al. | | 95/113 |
| 7,500,349 B2 * | 3/2009 | Althaus | | 60/39.511 |
| 7,632,339 B2 * | 12/2009 | Singh | | 95/273 |
| 7,922,790 B2 * | 4/2011 | Vertriest | | 95/117 |
| 7,938,888 B2 * | 5/2011 | Assaf | | 95/179 |
| 8,096,117 B2 * | 1/2012 | Ingersoll et al. | | 60/408 |
| 8,136,354 B2 * | 3/2012 | Havel | | 60/412 |
| 2003/0037679 A1 * | 2/2003 | Kitchener | | 96/270 |
| 2003/0131599 A1 | 7/2003 | Gerdes | | |
| 2004/0118125 A1 * | 6/2004 | Potnis et al. | | 60/775 |
| 2005/0252375 A1 * | 11/2005 | Iles et al. | | 95/148 |
| 2006/0213183 A1 | 9/2006 | Althaus | | |
| 2008/0223212 A1 | 9/2008 | Crowder et al. | | |
| 2009/0158740 A1 * | 6/2009 | Littau et al. | | 60/659 |

FOREIGN PATENT DOCUMENTS

| | | |
|---|---|---|
| EP | 0599961 B1 | 5/1996 |
| GB | 1152439 A | 5/1969 |
| JP | 3054326 A | 3/1991 |
| JP | 9239230 A | 9/1997 |

* cited by examiner

SYSTEM AND METHOD FOR REDUCING MOISTURE IN A COMPRESSED AIR ENERGY STORAGE SYSTEM

BACKGROUND OF THE INVENTION

Embodiments of the invention relate generally to compressed air energy storage (CAES) systems and, more particularly, to removing moisture in a CAES system.

CAES systems typically include a compression train having a plurality of compressors that compress intake air and provide the compressed air to a cavern or other compressed air storage volume. The compressed air is then later used to drive turbines to produce energy such as electrical energy. Often, if utility energy is used to power the compression train, the compression train operates during off-peak hours of utility plants while the energy production or generation stage of the CAES system typically operates during high energy demand times. However, this need not be the case in every instance. For example, energy generated from wind mills may be used to power the compression train while compressed air is delivered to the energy storage cavern or the like. In any event, the economics of the CAES system energy consumption versus CAES system energy production is typically a driving factor determining when the compression stage and the production stage operate.

During operation of the compression stage of a CAES system, the compressed air is typically cooled within the compression phase close to the temperature of the cavern or compressed air storage volume prior to storage. Further, during cooling, moisture often condenses out of the compressed air stream. However, there is often moisture left in the compressed air stream after cooling, which, as well as the above-mentioned condensation, may damage components of the CAES system.

Accordingly, it would be beneficial to have a method, apparatus, and system of removing moisture from a CAES system.

BRIEF DESCRIPTION OF THE INVENTION

Embodiments of the invention are directed to a method, system, and apparatus for removing moisture in a CAES system.

In accordance with one aspect of the invention, a compressed air energy storage (CAES) system includes an ambient air intake configured to intake a quantity of ambient air for storage in a compressed air storage volume, a compression system coupled to the ambient air intake, a first path proceeding from the ambient air intake to the compression system, a second path proceeding from the compression system to the compressed air storage volume, and a dehumidifying system. The compression system is configured to compress the quantity of ambient air to a quantity of compressed air and includes a compression path therethrough that is configured to convey the quantity of compressed air through the compression system. The first path is configured to convey the quantity of ambient air to the compression system and the second path is configured to convey the quantity of compressed air to the compressed air storage volume. The dehumidifying system is coupleable to at least one of the first path, the compression path, and the second path and includes a dehumidifying component configured to remove a quantity of moisture from one of the quantity of ambient air and the quantity of compressed air.

In accordance with another aspect of the invention, a CAES system includes a compression train having a first compressor configured to compress a quantity of ambient air into a first quantity of compressed air and a second compressor configured to compress the first quantity of compressed air into a second quantity of compressed air. The CAES system also includes a compressed air storage volume, a first compressed air conveyance path coupled to the compression train and to the compressed air storage volume, a power generation system, a compressed air exit path coupled to the power generation system and to the compressed air storage volume, and a dehumidifying component. The compressed air storage volume is configured to store the second quantity of compressed air. The first compressed air conveyance path is configured to convey the second quantity of compressed air to the compressed air storage volume. The power generation system is configured to generate electricity from a third quantity of compressed air. The compressed air exit path is configured to convey the third quantity of compressed air from the compressed air storage volume to the power generation system. The dehumidifying component is configured to remove a quantity of moisture from one of the ambient air and the compressed air prior to storage of the quantity of compressed air in the energy storage volume.

In accordance with yet another aspect of the invention, a method of removing moisture from a CAES system includes conveying a quantity of air through a compression system that has an air intake configured to intake the quantity of air into the compression system, at least two compressors configured to compress the quantity air after intake, and a compressed air outlet configured to provide a path for the quantity of air that is compressed to exit the compression system. The method also includes transferring the quantity of air exited from the compressed air outlet to a compressed air storage volume and passing the quantity of air through a dehumidifying system to remove moisture from the quantity of air prior to storage of the quantity of air in the compressed air storage volume. The compressed air storage volume configured to store the quantity of air for later energy production.

Various other features and advantages will be made apparent from the following detailed description and the drawings.

BRIEF DESCRIPTION OF THE DRAWINGS

The drawings illustrate one or more embodiments presently contemplated for carrying out the invention.

In the drawings.

DETAILED DESCRIPTION

Embodiments of the invention relate to adiabatic and diabatic CAES systems.

Figure 1:
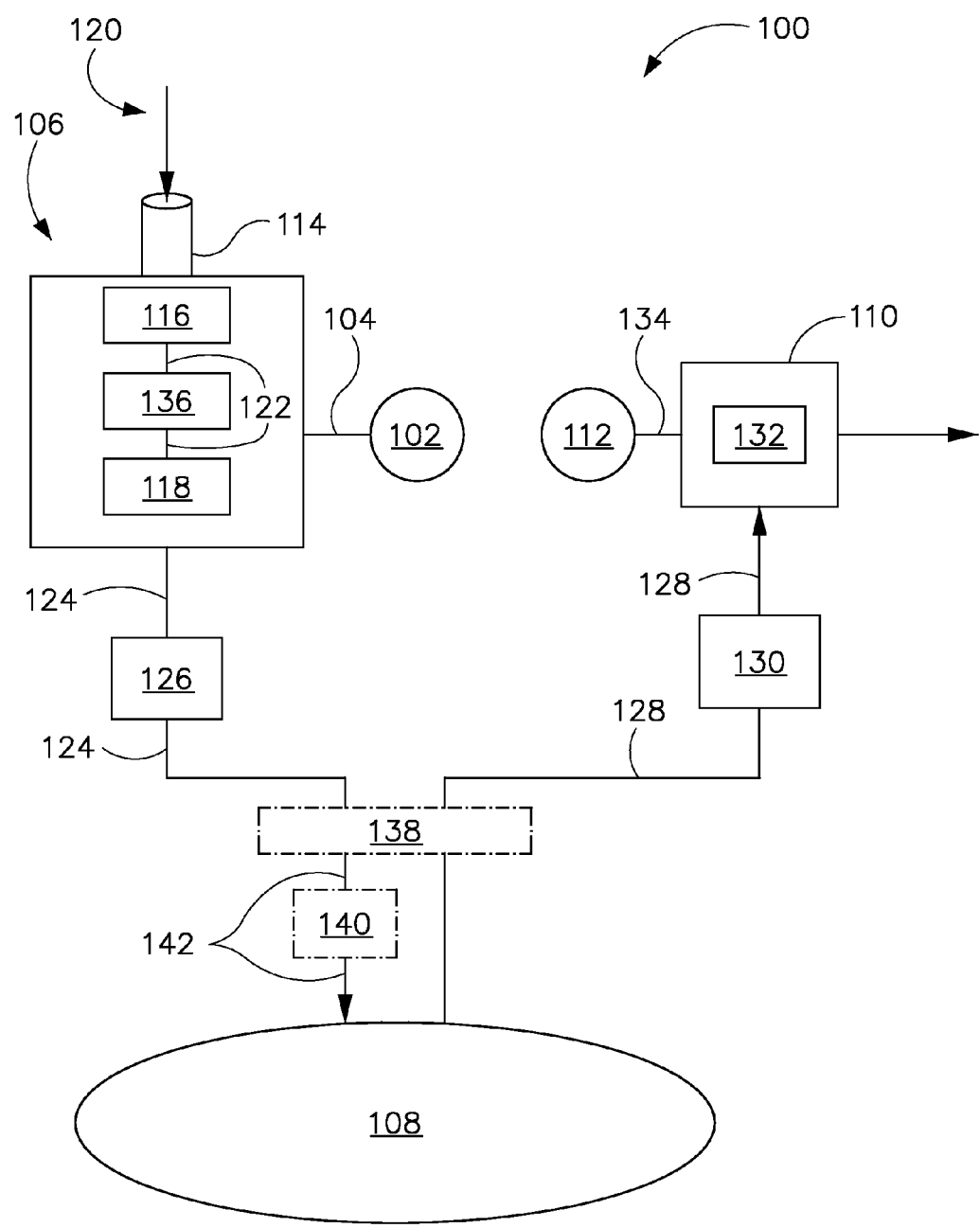
FIG. 1 is a block diagram of an exemplary CAES system having a dehydration system according to an embodiment of the invention

Referring to FIG. 1, a block diagram of an exemplary CAES system 100 is shown according to an embodiment of the invention. CAES system 100 includes a motor 102, a drive shaft 104, a compression train 106, a compressed air storage volume or cavern 108, an expansion system 110, and a generator 112.

According to an embodiment of the invention, motor 102 drives drive shaft 104. In turn, drive shaft 104 drives compression train 106. Compression train 106 includes an ambient air intake 114, a first compressor 116, and a second compressor 118. During operation of compression train 106, ambient air 120 enters ambient air intake 114 and is compressed by compression train 106, which includes first compressor 116 coupled to second compressor 118 via a compressor path 122. According to the present embodiment, first compressor 116 compresses the ambient air. The compressed ambient air then passes along compressor path 122 to second compressor 118, where second compressor 118 further compresses the ambient air before providing the compressed air along a compressed air path 124 to cavern 108.

Though only two compressors 116, 118 are shown in the present embodiment, it is contemplated that compression train 106 may include more than two compressors coupled together via compressor path 122. In addition, the two or more compressors (e.g., compressors 116, 118) need not be separate components. But rather, the two or more compressors could be incorporated in a single compression chain casing (not shown).

According to the present embodiment, before the compressed air is stored in cavern 108, it is passed through a cooling unit 126 that removes heat from the compressed air prior to storage in cavern 108. By removing heat from the compressed air prior to storage, the integrity of cavern 108 is protected. It is contemplated that other coolers such as an intercooler (not shown) could be utilized along compressor path 122 to cool air as it travels through compression train 106. It is also contemplated, however, that embodiments of the invention need not include cooling unit 126 and/or an intercooler.

After compressed air is stored in cavern 108, the compressed air is allowed to pass along an exit path 128, where the compressed air is reheated via a heating unit 130. The reheated compressed air proceeds through exit path 128 to expansion system 110. It is contemplated that expansion system 110 includes a first turbine 132. Due to the configuration of expansion system 110, the compressed air is allowed to expand as it passes therethrough; thus, causing rotation of first turbine 132. It is contemplated that expansion system 110 may include additional turbines (not shown) to facilitate in power generation. Referring to the present embodiment, the rotation of first turbine 132 causes a generator shaft 134 to rotate. In turn, generator shaft 134 drives generator 112, causing generator 112 to produce electricity.

According to an embodiment of the invention, CAES system 100 includes a dehumidifying system 136 that removes moisture from the air stream as it pass through compression train 106. As such corrosion and degradation of downstream components is minimized. For example, moisture-induced corrosion and/or degradation of turbomachinery (e.g., first turbine 132), heat exchangers (not shown), piping (not shown), and instrumentation (not shown) is minimized. It is noted that working temperatures (e.g., 550 to 700 degrees Celsius) and high pressures (e.g., 40 to 100 bar) encountered during operation of CAES systems (e.g., 100) can exacerbate deleterious effects of the humid air. Accordingly, dehumidifying system 136 minimizes deleterious effects associated with humid air.

It is contemplated that dehumidifying system 136 may include a desiccant-type dehumidifying component, a glycol-based dehumidifying component, a condensation-type, or other suitable dehumidifying component(s) capable of removing moisture from the working air stream of CAES system 100.

In an alternate embodiment, CAES system 100 is an adiabatic system that includes a thermal energy storage (TES) system 138 (shown in phantom). In such an embodiment, compressed air passing along compressed air path 124 to cavern 108 passes through TES system 138, which removes heat from the compressed air. The heat is stored by TES system 138, and is later conveyed back to the compressed air as the compressed air passes along exit path 128 back through TES system 138. In such an embodiment, the need for cooling unit 126 and heating unit 130 may be avoided such that CAES system 100 need not include heating and cooling heating units 126, 130, respectively.

In an embodiment that includes TES system 138, it is contemplated that CAES system 100 includes a dehumidifying system 140 (shown in phantom) along a portion 142 of compressed air path 124 that proceeds through TES system 138 to cavern 108. As such, according to the embodiment that employs TES system 138, two dehumidifying systems 136, 140 may be employed. Alternatively, only one of dehumidifying systems 136, 140 may be employed. Embodiments employing more than two dehumidifying systems (not shown) are also contemplated, including embodiments that dehumidify ambient air 120 prior to entering compression chain 106.

It is noted that embodiments that employ one or more dehumidifying systems upstream from TES 138 (e.g., dehumidifying system 136) effectively minimize moisture-induced corrosion and/or degradation of TES 138 and components thereof, such as heat storage inventory (not shown), insulation material (not shown), and/or pressure vessel material (not shown).

Accordingly, embodiments of the invention remove moisture from compressed air prior to storage of the compressed air in cavern 108. This moisture removal is in addition to any moisture removal that occurs during cooling of the compressed air.

Figure 2:
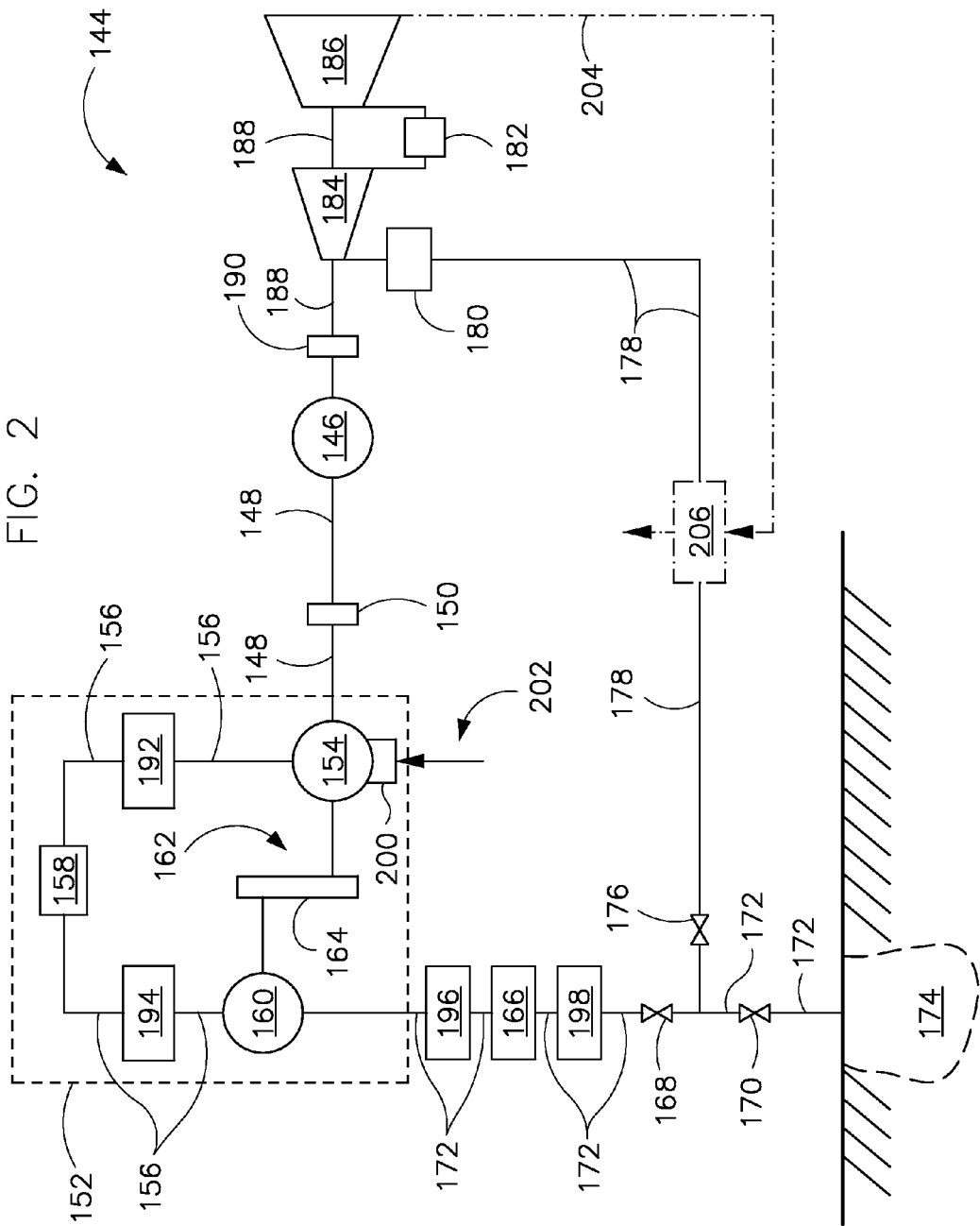
FIG. 2 is a block diagram of an exemplary CAES system having a dehydration system according to another embodiment of the invention.

Referring now to FIG. 2, a CAES system 144 is shown according to an alternate embodiment of the invention. CAES system 144 includes a compression stage that includes a motor/generator 146 and a drive shaft 148 coupled via a first clutch 150 to a compression train 152. Compression train 152 includes a first compressor 154, a compressor path 156, an intercooler 158 along compressor path 156, a second compressor 160, and a compressor drive shaft system 162 having a gear box 164. The compression stage of CAES system also includes an aftercooler 166, a first valve 168 and a second valve 170 along a compressed air path 172, and a storage volume 174.

Along an energy production stage of CAES system 144 is a third valve 176 along a compressed air exit path 178, a first heating unit 180, a second heating unit 182, a first expander 184, and a second expander 186, an expander drive shaft system 188, and second clutch 190 along expander drive shaft system 188. Embodiments of the invention include one or more dehumidifying systems such as one or more of a first dehumidifying system 192, a second dehumidifying system 194 (shown in phantom), a third dehumidifying system 196 (shown in phantom), or a fourth dehumidifying system 198 (shown in phantom).

During a compression stage, second clutch 190 is disengaged and first clutch 150 is engaged. Motor/generator 146 then drives a compression train 152 via drive shaft 148 and compressor drive shaft system 162. Compression train 152 includes an ambient air intake 200 and first and second compressors 154, 160. During operation of compression train 152, ambient air 202 is drawn through ambient air intake 200 to first air compressor 154. Accordingly, first compressor 154 compresses air flowing therethrough. Generally, the temperature of the air rises during compression. As such, air egressing from first compressor 154 along compressor path 156 is cooled by intercooler 158 before the compressed air is further compressed by second compressor 160. Again, compression tends to cause the air temperature to rise. As such, aftercooler 166 along compressed air path 172 is employed to cool the compressed air egressing from second compressor 160. It is contemplated that embodiments of the invention include additional compressors (not shown).

During the compression stage, first and second valves 168, 170 are manipulated to allow compressed air to flow to storage volume 174, and third valve 176 is manipulated so that compressed air does not flow to first and second expander 184, 186.

In one embodiment, first dehumidifying system 192 is coupled to compressor path 156 and is configured to remove moisture from the compressed air traveling through compressor path 156 prior to the compressed air passing over or entering intercooler 158. However, according to an alternate embodiment, a second dehumidifying system 194 (shown in phantom) is positioned along compressor path 156 such that compressed air leaving intercooler 158 passes therethrough. In such an embodiment, first dehumidifying system 192 need not be employed or installed. In either embodiment, moisture is removed from the compressed air, thus protecting downstream components of CAES system 144.

In yet another embodiment, third dehumidifying system 196 (shown in phantom) is positioned along compressed air path 172 such that air exiting from compression train 152 passes therethrough and is thus dehumidified. In still another embodiment, fourth dehumidifying system 198 (shown in phantom) is positioned along compressed air path 172 such that air exiting aftercooler 166 passes therethrough. Each dehumidifying system 192-198 may be employed independently or two or more of dehumidifying systems 192-198 may be used in conjunction with one another. Each dehumidifying system 192-198 serves to remove moisture from compressed air prior to storage of the compressed air in cavern or storage volume 174. As such, the integrity of cavern 174 is protected. Further, by removing moisture from the compressed air, each dehumidifying system 192-198 will minimize wear on any downstream components. Still further, wear on components of the production stage (e.g., during operation of first and second heating units 180, 182, and first and second expanders 184-186) caused by humidity or moisture in the system will also be minimized.

Since intercooler 158 and aftercooler 166 are employed to remove heat from the compressed air prior to storage, heating units 180, 182 are employed to reheat the air to maximize efficiency of the energy production. It is noted that heating units 180, 182 also serve to protect first and second expanders 184, 186. For example, if the compressed air entering into first and/or second expanders 184, 186 via compressed air exit path 178 is not properly warmed, the low temperatures attained during the expansion may cause first and/or second expander 184, 186 to "freeze-up." Accordingly, first heating unit or burner 180 warms the compressed air entering into first expander 184 and second heating unit or burner 182 warms the partially expanded air entering second expander 186. As such, "freeze-up" conditions are avoided. It is contemplated, however, that embodiments include configurations in which no heating units (e.g., heating units 180,182) are employed such that a cold air stream is produced that may be used for cooling or freezing purposes.

In an alternate embodiment, rather than employing first and second heating units 180, 182, exhaust air from first and/or second expanders 184, 186 is passed through an exhaust path 204 (shown in phantom) over a heat exchanger 206 (shown in phantom). As such, heat from the exhaust air is transferred to compressed air travelling along compressed air exit path 178, thus warming the compressed air prior to expansion.

Figure 3:
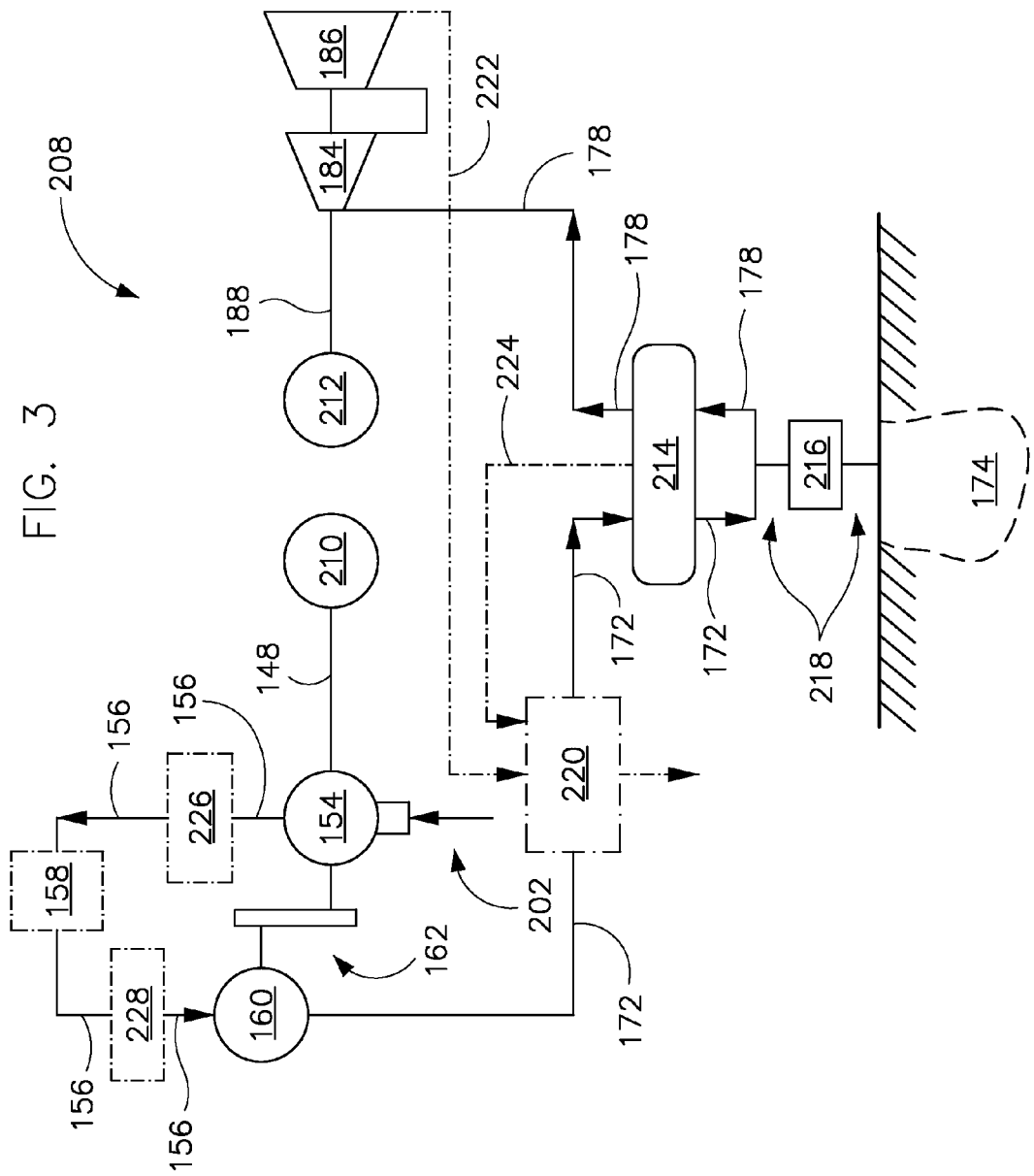
FIG. 3 is a block diagram of an exemplary adiabatic CAES system having a dehydration system according to another embodiment of the invention.

Referring now to FIG. 3, an adiabatic CAES system 208 is shown according to an embodiment of the invention. Similar components among FIG. 2 and FIG. 3 are shown with common reference numerals. Rather than including a single motor/generator unit, such as motor/generator 146 of FIG. 2, the embodiment of FIG. 3 includes a motor 210 to generate power for compression and a separate generator 212 for energy production. Further, in contrast to the embodiments depicted in FIG. 2, adiabatic CAES system 208 includes a thermal energy storage (TES) system 214. TES system 214 is configured to remove and store heat from compressed air passing along compressed air path 172 prior to storage of the compressed air in storage volume 174. As the compressed air proceeds to compressed air exit path 178, TES system 214 transfers heat back to the compressed air prior to the compressed air entering first and second expanders 184, 186. Accordingly, neither burners 180, 182 of FIG. 2 nor heat exchanger 206 need be employed.

According to an embodiment of the invention, adiabatic CAES system 208 includes a dehumidifying system 216 coupled to a portion 218 of compressed air path 172, which also serves as compressed air exit path 178 during an energy production stage. In such an embodiment, moisture is removed from the compressed air prior to storage in storage volume 174 and is once again dehumidified as compressed air proceeds through compressed air exit path 178 to first and second expanders 184, 186.

Alternatively, rather than positioning dehumidifying system 216 between TES system 214 and storage volume 174, a dehumidifying system 220 (shown in phantom) may be positioned along compressed air path 172 such that moisture is removed from the compressed air prior to passing the compressed air through TES system 214. In such an instance, TES system 214 is protected, or at least partially protected, from the deleterious effects moisture can have on the components thereof. For example, corrosion and reverse chemistry that may be caused by the moisture is avoided or at least minimized.

It is contemplated that an exhaust heat 222 (shown in phantom) from first and/or second expanders 184, 186 and/or a quantity of heat 224 (shown in phantom) from TES system 214 may be used to recharge dehumidifying system 220. In other words, heat 222 and/or 224 may be used to remove or purge any moisture built up in dehumidifying system 220. Though not shown, in a similar manner, heat 224 from TES system 214 and/or exhaust heat 222 from first and/or second expanders 184, 186 may be used to recharge dehumidifying system 216. It is noted that other heat sources (not shown) such as one or more electrically driven heat sources may be additionally or alternatively used to recharge dehumidifying systems 216, 220.

Rather than, or in addition to, adiabatic CAES system 208 having dehumidifying system 216 and/or dehumidifying system 220, adiabatic CAES system 208 may include a dehumidifying system 226 (shown in phantom) coupled to compressor path 156 upstream from intercooler 158 and/or a dehumidifying system 228 (shown in phantom) coupled to compressor path 156 downstream from intercooler 158. Similar to the recharging discussed above, exhaust heat from first and/or second expanders 184, 186, heat from TES system 214, and/or heat from other heat sources may be used to recharge one or more of dehumidifying systems 226, 228.

It is noted that adiabatic system 208 may include one or more of depicted dehumidifying systems 216, 220, 226, 228.

Figure 4:
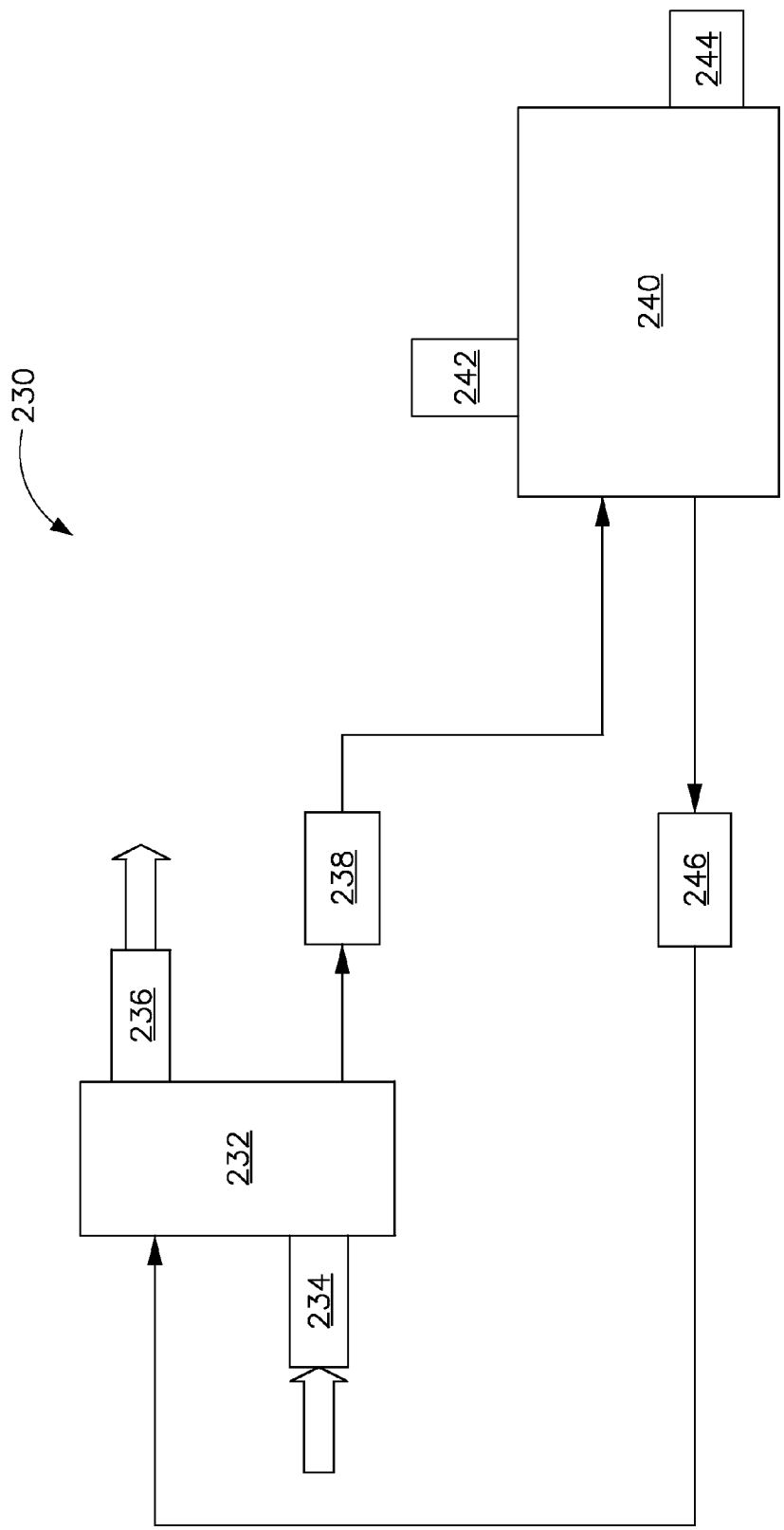
FIG. 4 is a block diagram of an exemplary dehydration system according to an embodiment of the invention.

Referring now to FIG. 4, an exemplary dehumidifying system 230 is shown according to an embodiment of the invention that may be used for the dehumidifying systems in the embodiments of the invention discussed herein. Dehumidifying unit or system 230 includes a dehumidifying component 232, a compressed air inlet 234, a compressed air outlet 236, a driver 238, a regenerator 240 having a moisture outlet 242, a heating unit 244, and a pump 246.

Similar to the manner in which dehumidifying systems 192-198, 216, 220, 226, 228 are positioned or coupled in respective CAES systems 144, 208, dehumidifying system 230 is positionable in a CAES system (adiabatic or non-adiabatic) such that compressed air enters into dehumidifying component via compressed air inlet 234 and moisture therein is removed by a solution of dehumidifying component 232. The solution within dehumidifying component 232 may include, for example, a glycol-based solution that removes moisture from humid air. Dry, or at least partially dry, compressed air exits from dehumidifying component 232 via compressed air outlet 236 and proceeds through the CAES system (e.g., CAES system 100 of FIG. 1, 144 of FIG. 2, and 208 of FIG. 3) as described above. Moisture built up in dehumidifying component 232 of FIG. 4 is allowed to pass to regenerator 240 with the aid of driver 238. That is, driver 238 drives a solution having moisture therein to regenerator 240. Heat is added to regenerator 240 via heating unit 244 to boil off or purge moisture from the solution transferred to regenerator 240, thus expelling the moisture to the atmosphere via moisture outlet 242. It is contemplated the heating unit 244 may comprises a heat exchanger (e.g., heat exchanger 206 of FIG. 2), a combustion or electrically driven burner, or the like. Pump 246 of FIG. 4 pumps the regenerated solution, now with the moisture at least substantially removed, back to dehumidifying component 232.

It is contemplated that the heat provided to heating unit 244 of regenerator 240 may be provided from an expander exhaust or a TES system in a manner similar to that shown in FIG. 3. Further, it is also contemplated that other heat sources may be used to supply heat to regenerator 240 of FIG. 4.

Figure 5:
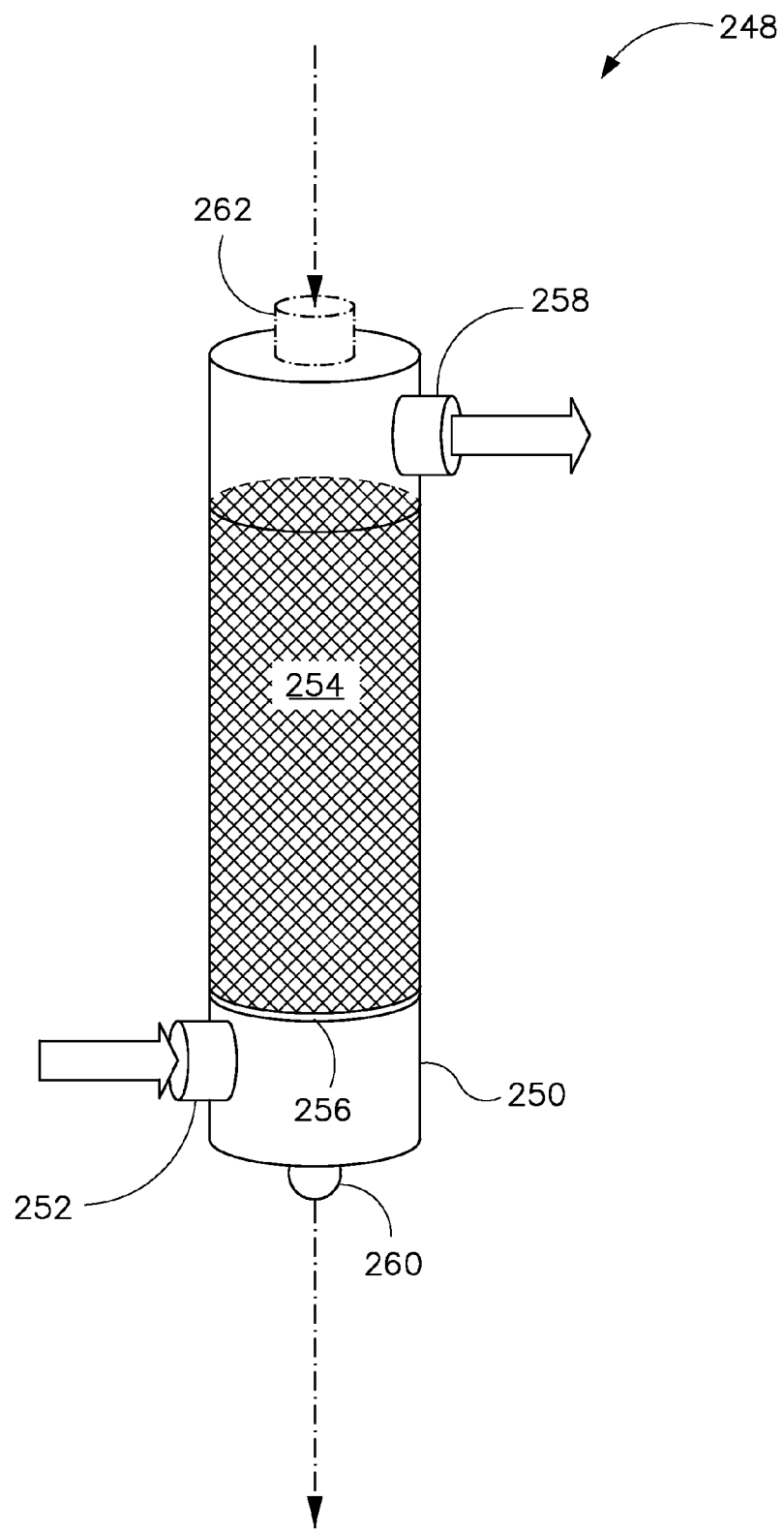
FIG. 5 a block diagram of an exemplary dehydration system according to another embodiment of the invention.

Referring now to FIG. 5, a dehumidifying system 248 is shown according to another embodiment of the invention that may be used for the dehumidifying systems in the embodiments of the invention discussed herein. Dehumidifying system 248 is a desiccant-type of dehumidifying system and includes a dehumidifying component 250, a compressed air inlet 252, a desiccant material 254, a support grid 256 to support desiccant material 254, a compressed air outlet 258, and a drain valve 260.

During operation, compressed air having moisture therein enters through compressed air inlet 252, passes through support grid 256 and desiccant material 254, and the exits through compressed air outlet 258 back into the compressed air path of the CAES system (e.g. compressed air path 124 of the FIG. 1 CAES system 100, compressed air path 172 of the FIG. 2 CAES system 144, or compressed air path 172 of the FIG. 3 CAES system 208). Desiccant material 254 of FIG. 4 is configured to absorb moisture from humid compressed air. As such, the compressed air egressing from compressed air outlet 258 generally has a reduced moisture content relative to the compressed air entering through compressed air inlet 252.

When desiccant material 254 becomes saturated, or approaches saturation, drain valve 260 is opened to allow moisture captured by dehumidifying component 250 to drain therefrom.

It is contemplated that dehumidifying component 250 include a recharging air inlet 262 (shown in phantom), that allows warm air to pass into dehumidifying component 250 and out drain valve 260 thereof. In such an embodiment, the warm air passing through dehumidifying component 250 draws moisture from desiccant material 254. As such, humid air exits or is expelled through drain valve 260 to recharge dehumidifying component 250.

It is contemplated that exhaust air leaving one or more expanders of a CAES system may be directed through dehumidifying component 250 via recharging air inlet 262 for recharging. For example, exhaust path 204 of FIG. 3 may be directed through dehumidifying component 250 for recharging purposes. Alternatively, heat from a TES system (e.g., TES system 214 of FIG. 3) may be directed through dehumidifying component 250 of FIG. 5 for recharging purposes. It is noted, however, that other heat sources besides, or in addition to, exhaust air or a TES system could be used, such as a combustion or electrically driven heat source, to recharge dehumidifying system 248.

In accordance with one embodiment of the invention, a CAES system includes an ambient air intake configured to intake a quantity of ambient air for storage in a compressed air storage volume, a compression system coupled to the ambient air intake, a first path proceeding from the ambient air intake to the compression system, a second path proceeding from the compression system to the compressed air storage volume, and a dehumidifying system. The compression system is configured to compress the quantity of ambient air to a quantity of compressed air and includes a compression path therethrough that is configured to convey the quantity of compressed air through the compression system. The first path is configured to convey the quantity of ambient air to the compression system and the second path is configured to convey the quantity of compressed air to the compressed air storage volume. The dehumidifying system is coupleable to at least one of the first path, the compression path, and the second path and includes a dehumidifying component configured to remove a quantity of moisture from one of the quantity of ambient air and the quantity of compressed air.

In accordance with another embodiment of the invention, a CAES system includes a compression train having a first compressor configured to compress a quantity of ambient air into a first quantity of compressed air and a second compressor configured to compress the first quantity of compressed air into a second quantity of compressed air. The CAES system also includes a compressed air storage volume, a first compressed air conveyance path coupled to the compression train and to the compressed air storage volume, a power generation system, a compressed air exit path coupled to the power generation system and to the compressed air storage volume, and a dehumidifying component. The compressed air storage volume is configured to store the second quantity of compressed air. The first compressed air conveyance path is configured to convey the second quantity of compressed air to the compressed air storage volume. The power generation system is configured to generate electricity from a third quantity of compressed air. The compressed air exit path is configured to convey the third quantity of compressed air from the compressed air storage volume to the power generation system. The dehumidifying component is configured to remove a quantity of moisture from one of the ambient air and the compressed air prior to storage of the quantity of compressed air in the energy storage volume.

In accordance with yet another embodiment of the invention, a method of removing moisture from a CAES system includes conveying a quantity of air through a compression system that has an air intake configured to intake the quantity of air into the compression system, at least two compressors configured to compress the quantity air after intake, and a compressed air outlet configured to provide a path for the quantity of air that is compressed to exit the compression system. The method also includes transferring the quantity of air exited from the compressed air outlet to a compressed air storage volume and passing the quantity of air through a dehumidifying system to remove moisture from the quantity of air prior to storage of the quantity of air in the compressed air storage volume. The compressed air storage volume configured to store the quantity of air for later energy production.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A compressed air energy storage (CAES) system comprising:
    an ambient air intake configured to intake a quantity of ambient air for storage in a compressed air storage volume;
    a compression system coupled to the ambient air intake and configured to compress the quantity of ambient air to a quantity of compressed air, the compression system comprising:
        a first compressor configured to compress the quantity of ambient air;
        a second compressor configured to further compress the quantity of ambient air; and
        a compression path between the first compressor and the second compressor configured to convey the quantity of compressed air through the compression system;
    a first path proceeding from the ambient air intake to the compression system and configured to convey the quantity of ambient air to the compression system;
    a second path proceeding from the compression system to the compressed air storage volume and configured to convey the quantity of compressed air to the compressed air storage volume;
    wherein the CAES system is an adiabatic CAES system and further comprises a thermal energy storage (TES) system along the second path between the compression system and the compressed air storage volume, the thermal energy storage system configured to remove and store a quantity of heat from the quantity of compressed air;
    a dehumidifying system coupled to the compression path, the dehumidifying system comprising a dehumidifying component positioned upstream from the compression system and configured to remove a quantity of moisture from the quantity of compressed air; wherein the dehumidifying system removes the quantity of moisture from the quantity of compressed air prior to the quantity of compressed air reaching the TES system and wherein the dehumidifying system further comprises a heating system configured to remove moisture from the dehumidifying component.

2. The CAES system of claim 1 wherein the dehumidifying component comprises a desiccant-based dehumidifying component.

3. The CAES system of claim 1 wherein the dehumidifying component comprises a glycol-based dehumidifying component.

4. The CAES system of claim 1 wherein the heating system is configured to convey heat from a turbine exhaust from the CAES to the dehumidifying component to remove the moisture.

5. The CAES system of claim 1 wherein the heating system comprises at least one of a combustion heat generating component and an electrical heat generating component.

* * * * *